March 6, 1945. R. T. BLAKELY 2,371,120
MACHINE FOR READING PERFORATED RECORD CARDS
Filed Aug. 12, 1942 8 Sheets-Sheet 1

INVENTOR
Robert T. Blakely
BY
W. M. Wilson
ATTORNEY

March 6, 1945.  R. T. BLAKELY  2,371,120
MACHINE FOR READING PERFORATED RECORD CARDS
Filed Aug. 12, 1942  8 Sheets-Sheet 2
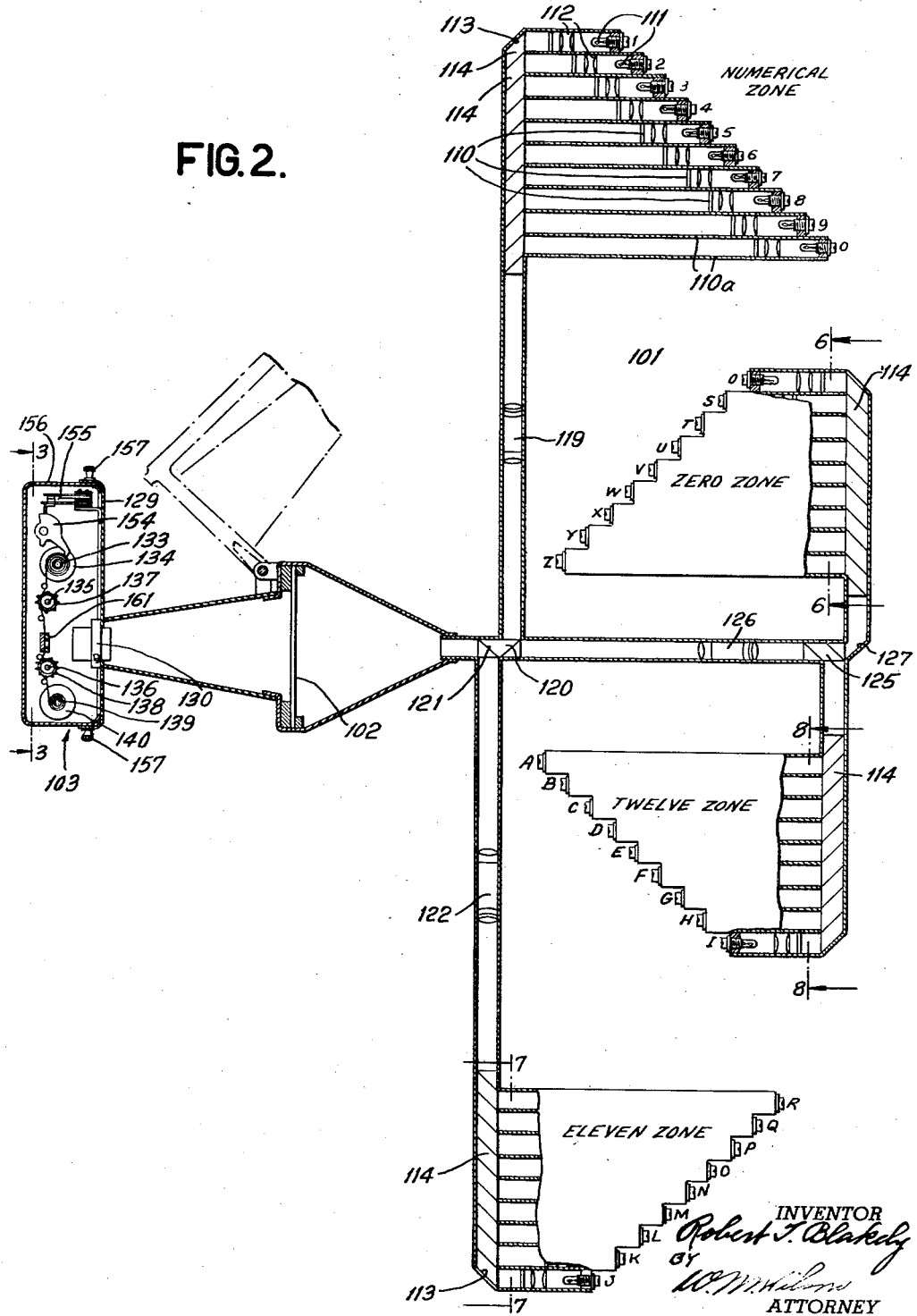

March 6, 1945. R. T. BLAKELY 2,371,120
MACHINE FOR READING PERFORATED RECORD CARDS
Filed Aug. 12, 1942 8 Sheets-Sheet 3
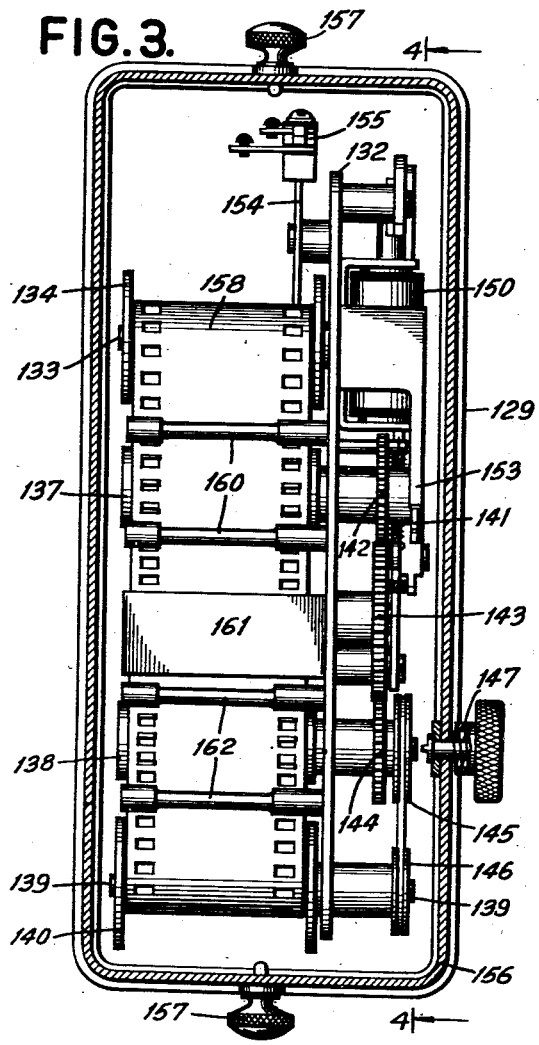
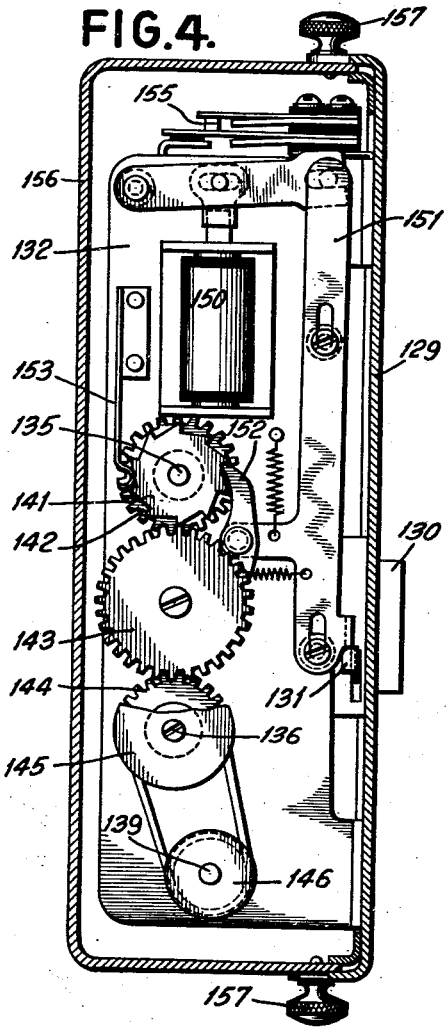
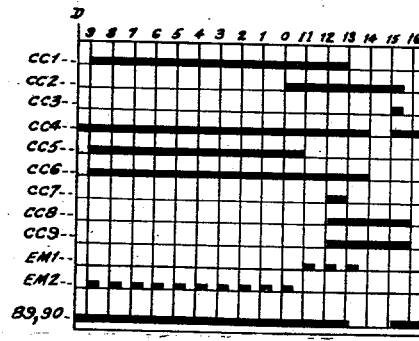

March 6, 1945. R. T. BLAKELY 2,371,120
MACHINE FOR READING PERFORATED RECORD CARDS
Filed Aug. 12, 1942 8 Sheets-Sheet 4
FIG.5. FIG.6.
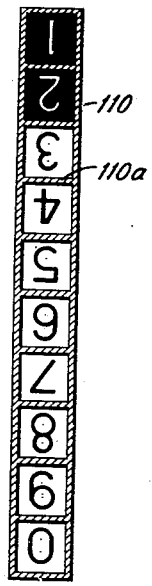
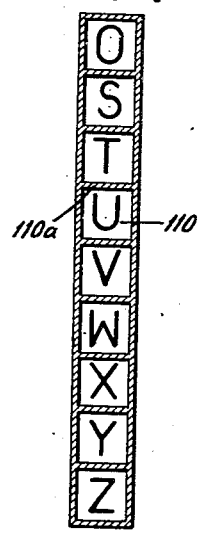
FIG.9.
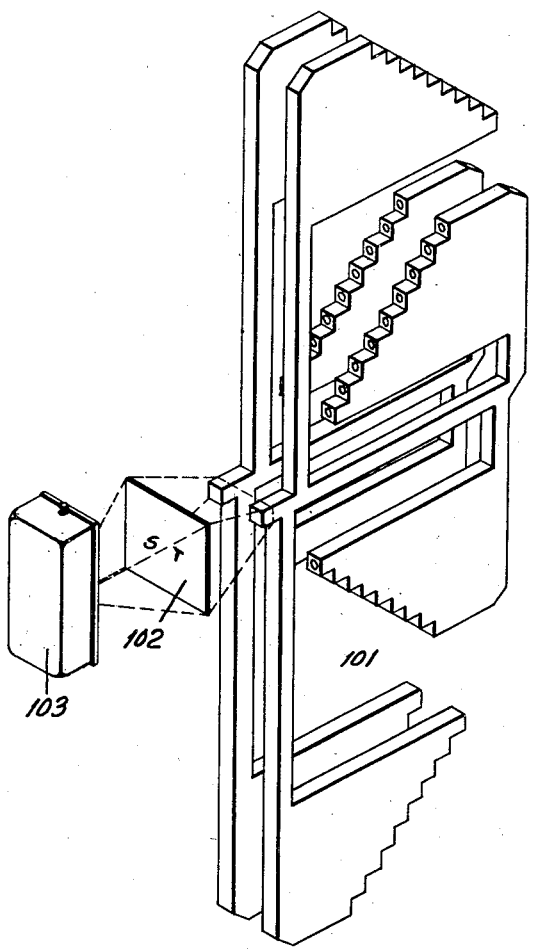
FIG.7. FIG.8.
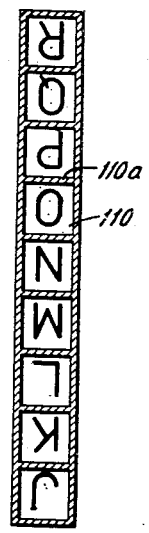
INVENTOR
Robert T. Blakely
BY
ATTORNEY

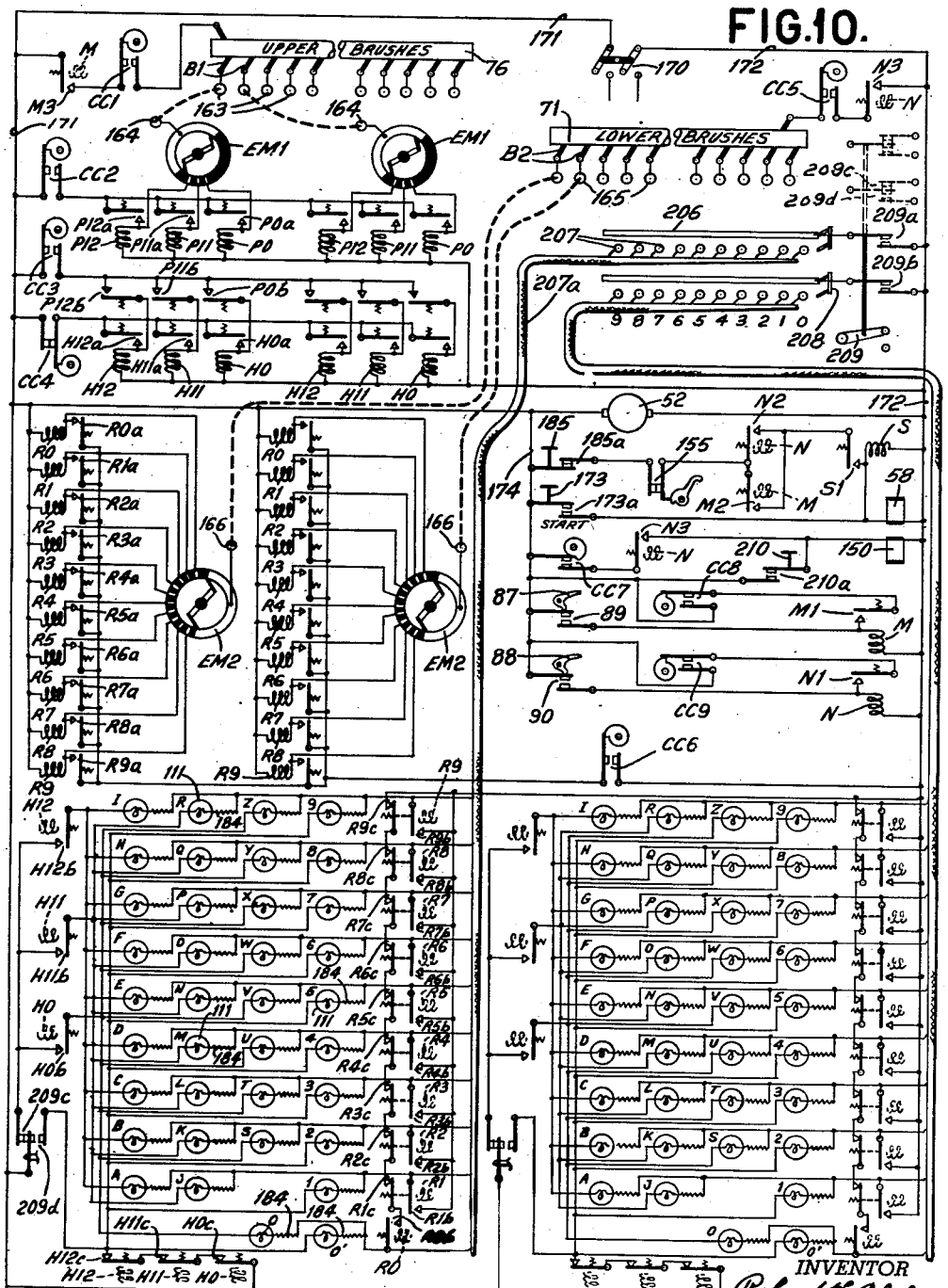

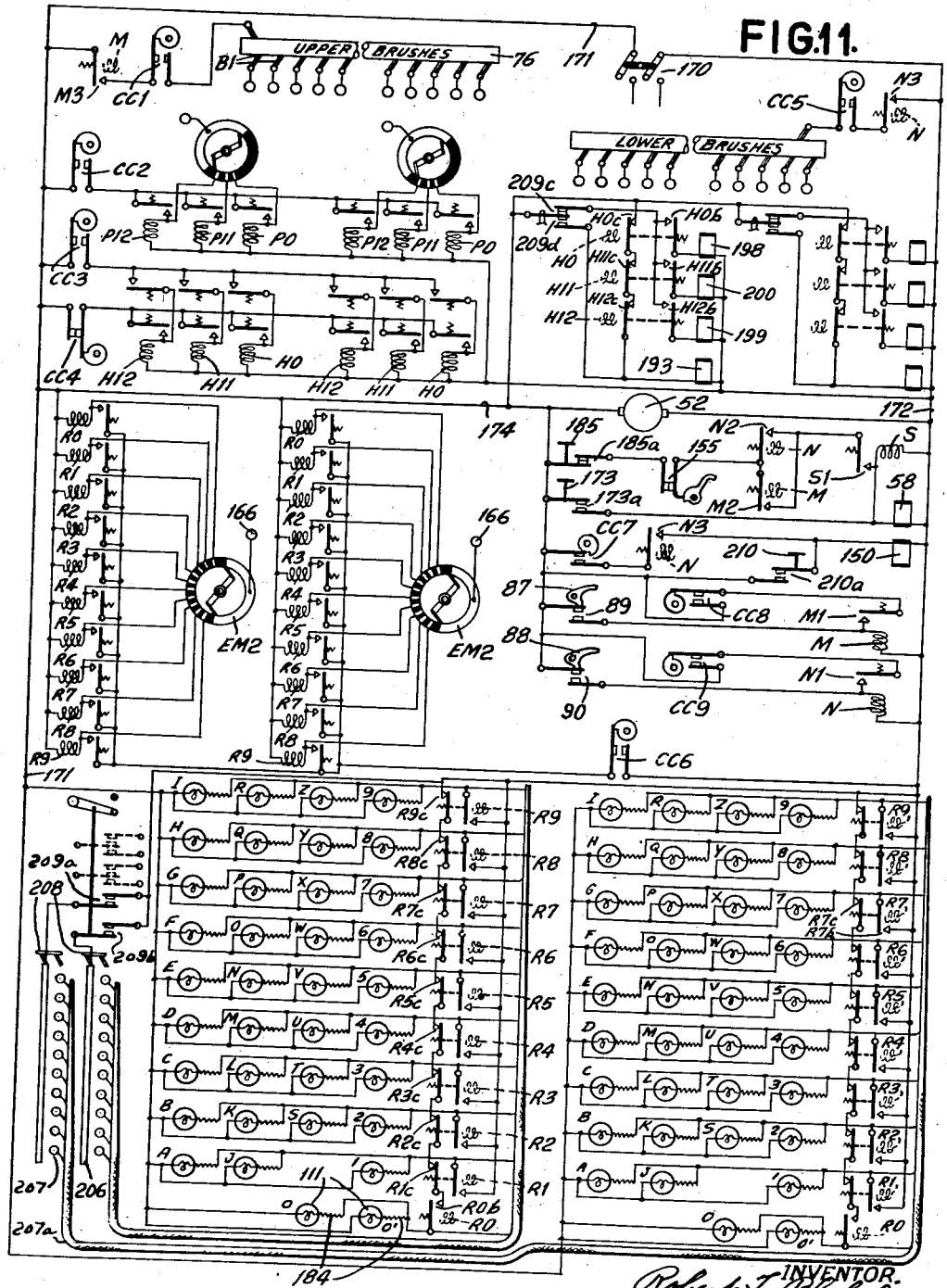

March 6, 1945.  R. T. BLAKELY  2,371,120

MACHINE FOR READING PERFORATED RECORD CARDS

Filed Aug. 12, 1942  8 Sheets-Sheet 7

INVENTOR
Robert T. Blakely
BY
ATTORNEY

March 6, 1945. R. T. BLAKELY 2,371,120
MACHINE FOR READING PERFORATED RECORD CARDS
Filed Aug. 12, 1942 8 Sheets-Sheet 8

INVENTOR
Robert T. Blakely
BY
W. M. Wilson
ATTORNEY

Patented Mar. 6, 1945

2,371,120

UNITED STATES PATENT OFFICE 2,371,120

MACHINE FOR READING PERFORATED RECORD CARDS

Robert T. Blakely, Amityville, N. Y., assignor to International Business Machines Corporation, New York, N. Y., a corporation of New York Application August 12, 1942, Serial No. 454,593

9 Claims. (Cl. 88—24)

This invention relates to record card controlled accounting machines and more particularly to a device for interpreting and recording data represented on record cards in the form of coded designations.

The principal object of the invention is to provide an improved device for recording alphabetic data derived from record cards. Such cards are generally provided with a plurality of data receiving columns, one for each character. Each column is divided into twelve so-called "index point positions," equally spaced, wherein any letter of the alphabet is represented by a perforation in each of two positions. The positions are divided into two groups known as the zone positions and the intrazone positions. By dividing the alphabet into three parts, three zone positions are used to designate the three parts generally and the remaining nine positions indicate the particular letter within the zone.

In carrying out the object of the invention, an improved optical system is provided in which for each card column there is a series of marks containing character patterns, one for each of the letters and digits, arranged in a common plane with projection systems through which the different character patterns are all projected from the masks to a common point on a screen.

The accounting machine is provided with a set of so-called "upper" sensing brushes to which the cards are first fed and so-called "lower" sensing brushes to which each card is fed exactly one machine cycle later. As the card passes the upper sensing brushes, the zone holes are sensed to determine for each column which zone of the alphabet is represented, and devices controlled by the upper brushes effect a setting accordingly. As the card later passes the lower sensing brushes, the intrazone holes are sensed to determine the particular character within the selected zone and further devices are set which jointly with the first set devices render the optical system related to the selected character effective to project that character on to the screen.

After a card has been sensed by both sets of brushes, there will be projected on the screen a line of characters representing the interpretation of the holes in the several card columns. Camera mechanism is then automatically operated to record the characters appearing on the screen. This operation is repeated for each card with film spacing in between, so that after a group of cards has been sensed the film will contain a record of the interpreted data with a line for each card.

A further object of the invention resides in the provision of a device settable to represent an amount, which device is associated with the selecting mechanism to operate the same independently of the card sensing devices. Thus, where it is desired to record some data not contained on a card, such data may be manually or otherwise set up on the settable device and such data interpreted and projected on the screen for recording.

In the preferred form of the invention, each columnar lens system employs a separate projection path for each different character with an activating lamp for each. The sensing brushes, through relay devices, select one lamp which upon illumination directly projects the desired character image on to the screen.

In a modified form of the invention, each character lens system is normally blocked by a shutter and, when an intrazone hole is sensed, the lamps related to all characters having such intrazone hole are illuminated. According to the coding, each of such characters is in a different zone. The zone hole opens all shutters in the related zone, so that as a result a projection path is selected for only the character represented by the punching in the related card column even though several lamps are illuminated.

In the figures:

Fig. 2 is a central section of the interpreting and recording devices of the machine.

Fig. 3 is a section of the camera unit taken on line 3—3 of Fig. 2.

Fig. 4 is another sectional view of the camera unit taken on line 4—4 of Fig. 3.

Fig. 4a is a timing chart of the cam controlled contacts.

Figs. 5, 6, 7 and 8 are sections taken on lines 5—5, 6—6, 7—7, and 8—8, respectively, of Fig. 2 and show the character patterns.

Fig. 9 is an isometric view showing a pair of character interpreting and projecting lens systems.

Fig. 10 is a circuit diagram of the machine.

Fig. 11 is a circuit diagram of a modified embodiment of the machine.

Figure 12:
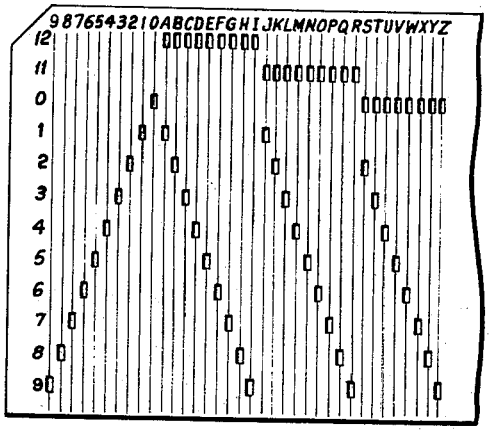

Fig. 12 is a portion of a card showing the coding arrangement of the several characters.

Figure 13:
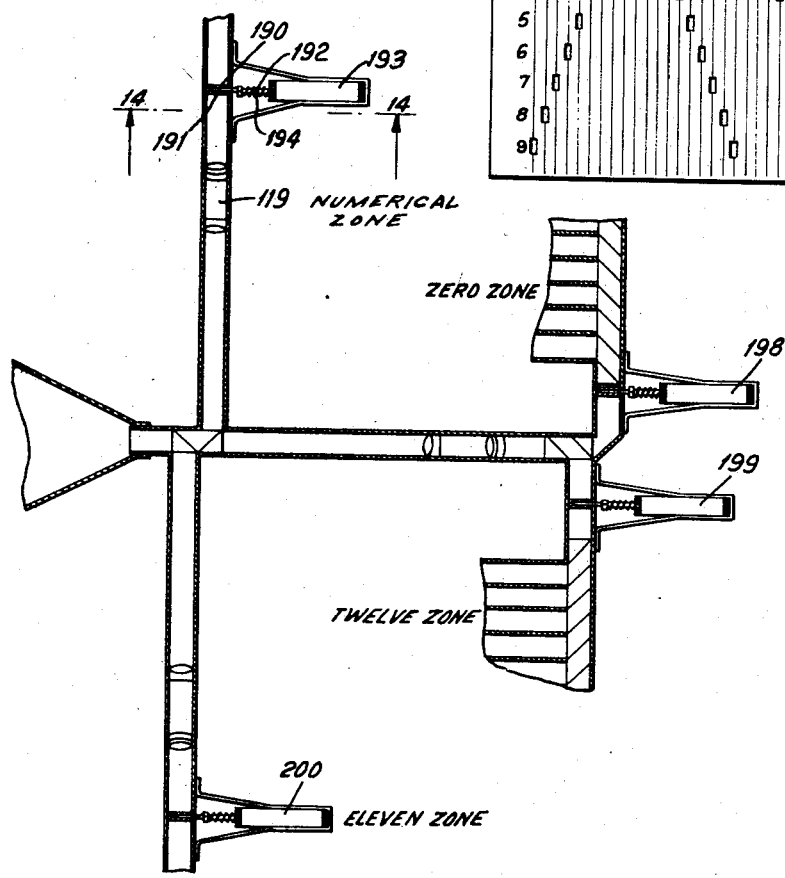

Fig. 13 shows a detail of a modified embodiment of lens system of the machine.

Figure 14:
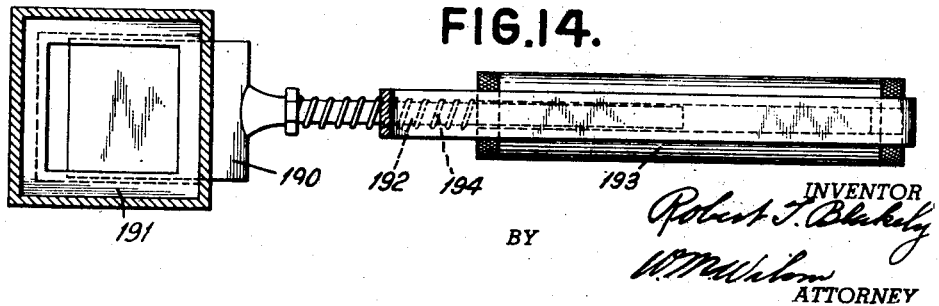

Fig. 14 is a section taken on line 14—14 of Fig. 13.

Figure 15:
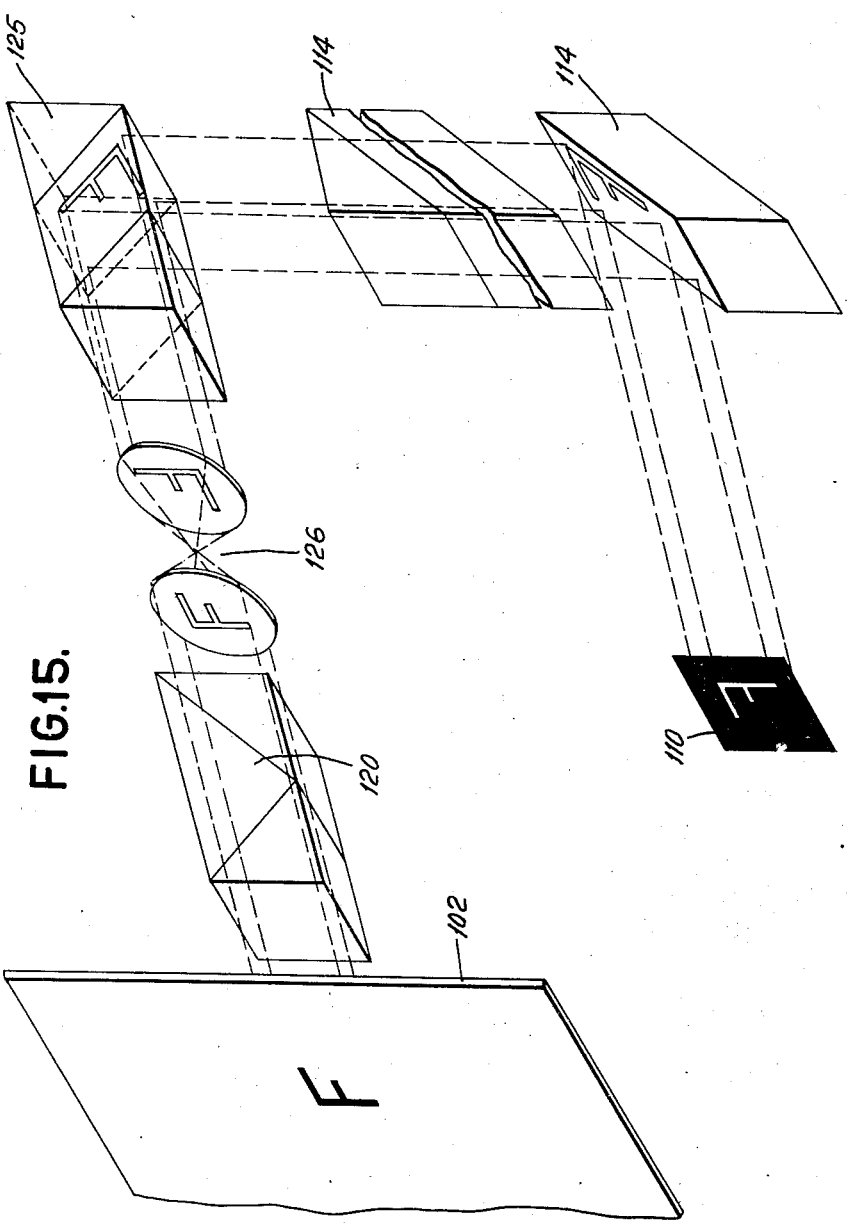

Fig. 15 is a diagram showing the optical projection path of one of the characters.

General operation

It has been previously mentioned that one of the primary objects of the device is to record alphabetic characters on a film under control of a character selecting device. Such characters are to be recorded by a novel optical system and character selecting mechanism. The characters are derived from a plurality of character patterns. These are each transilluminated by an individual light source, one for each character pattern. By means of a suitable lens system the character patterns, when transilluminated, are projected through a series of prisms upon a ground glass screen in a superimposed relation. By means of a character selecting mechanism controlled from a record card, only the desired character in a particular column will be transilluminated and projected on the ground glass screen.

Card Feeding Mechanism

Card feeding and analyzing mechanism to effect deriving of data from the record cards is provided which will first be described.

Figure 1:
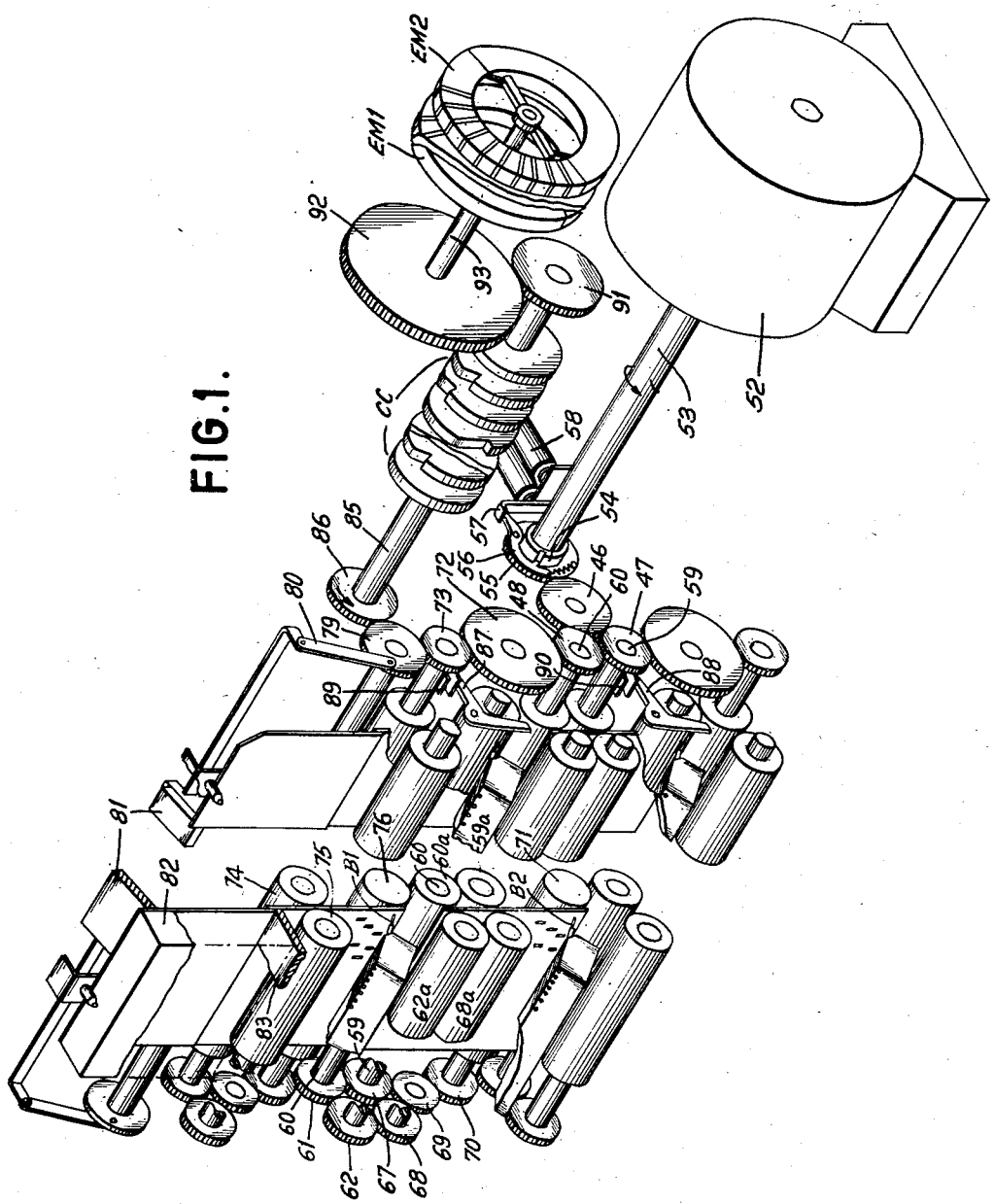
Fig. 1 is a diagrammatic view of the record card feeding and sensing devices of the machine with frame and mounting parts omitted for clarity of illustration.

To provide drive for the various parts of the card feeding mechanism, a motor 52 (see Fig. 1) which drives a shaft 53 is provided secured to which is the notched driving element 54 of a one revolution clutch. Freely rotatable on the shaft 53 is a gear 55 and secured to the gear 55 is a dog 56 normally restrained from engagement with the notched element 54 by an armature latch 57, which is controlled by a clutch magnet 58. Energization of magnet 58 will permit the dog 56 to engage element 54, thereby causing rotation of gear 55 secured thereto. Gear 55 through an idler 46 drives the gears 47 and 48 secured to feed roll shafts 59 and 60.

The other end of shaft 60 carries a gear 61 which drives a gear 62 which is also fast to a feed roll 62a. In a similar manner a gear 67 on shaft 59 drives a gear 68 fast to a shaft for driving feed roll 68a. Drive is also provided from the gear 67 through an idler 69 to a gear 70 fast to a shaft driving a contact roll 71. Drive is provided from gear 48 through an idler 72 to a gear 73 which in a similar manner to that described for the lower rolls drives feed rolls 74 and 75 and a contact roll 76. Gear 73 drives a gear 79 which has a link 80 secured thereto for driving the usual picker 81, which picker 81 picks cards 82 one at a time from the hopper 83 and feeds them to the feed rolls 74 and 75 which in turn carry the card past a set of upper analyzing brushes B1. Thereafter, the card is fed by the rolls 59a, 60a, 62a, and 68a past the lower analyzing brushes B2, and further feed rolls driven in a manner similar to those above carry the card out of the feeding unit.

During the first card feed cycle, following energization of the card feed clutch magnet 58, the first card will be fed to a position where its leading edge is under brushes B1. During the second cycle the card will be fed past brushes B1 and to the brushes B2, while a second card is advanced to a position where its leading edge is under brushes B1. During the third cycle the first card will be fed past the brushes B2 and the following card will be fed past the brushes B1. The card feed unit includes two card levers 87 and 88 which close contacts 89 and 90, respectively, when cards are feeding through the machine. The time of closure of these contacts is shown in Fig. 4a. The card feeding mechanism thus briefly described is of the usual construction found in tabulating machines.

Cam contact and emitter devices

For controlling certain contact making devices in the machine there is provided a number of cams generally prefixed CC. These cams are fast to a shaft 85 which is secured to a gear 86 driven by the gear 79, so as to make one revolution for each card feeding cycle. The CC cams actuate a number of contacts, the time of closure of which is shown in Fig. 4a. Secured to the other end of shaft 85 is a gear 91 which drives a gear 92. A shaft 93 is rotated by gear 92 and drives the rotating elements of a number of emitters designated EM1, EM2. The drive ratio between gears 91 and 92 is such that the brush element of an emitter rotates one-half a revolution in one card feeding cycle.

Recording unit

The recording unit is generally shown in Fig. 2 and comprises a prism and character pattern unit generally designated 101, a ground glass screen 102 and a camera 103 (see also Fig. 9).

Prism and character pattern unit

The prism and character pattern unit is shown in greater detail in Fig. 2. A number of character patterns 110 (see also Figs. 5–8) are disposed each in a light-tight tube 110a. The light-tight tubes are grouped in the manner shown according to zones, the numerical characters all being grouped together in a so-called "numerical" zone. The alphabetic characters A—I are grouped in a "12" zone. The characters J—R in an "11" zone and the characters S—Z and an additional 0 (zero) are grouped in the 0 zone (see also Fig. 12 which shows the grouping of the various characters and numerals as usually employed in representing them on the well known Hollerith tabulating card).

These patterns in Figs. 6, 7, and the lower part of Figs. 5 and 8 are shown as opaque for clarity of illustration, but actually will be translucent characters as shown for "1" and "2" or "A" and "B." Considering for example the numerical zone, each character (see Fig. 2) is trans-illuminated by a light source 111 and intermediate the light source 111 and the character pattern 110 is a condensing lens 112.

Considering now the projection path of the character "1," after the light passes through the condensing lens 112 and character pattern 110 the beam passes to a mirror surface 113 of a prism 114 and then passes to the next prism 114. These prisms 114 are of the well known intercepting type and there are a series of these prisms, one for each of the characters. The image of the character "1" passes through all of these and then passes through the objective lens 119. The image is then reflected by a reflecting transmitting prism 120 and passes through from the back of the partially reflecting light transmissive surface 121 and is focused on the ground glass 102.

Path for the character 2 is similar except the image is first partially reflected by the next to the uppermost prism 114 and then passes through the lower ones to the objective lens 119 and then is partially reflected by prism 120, through surface 121 to ground glass 102. Similar paths for the characters 3–9 and 0 may also be traced as will be understood by referring to Fig. 2.

The images of characters J, K, L ... P, Q, R pass through a similar objective lens 122 and are partially reflected by the surface 121 to ground glass 102. Characters A, B, C ... H, I (see also Fig. 15 which shows the light path of the character F) are partially reflected by the nearest prism 114, then pass through the other prisms 114 and are then partially reflected by a prism 125 through a lens 126, through prism 120, to ground glass 102. Similarly, the character images of the "0" zone pass through prisms 114 and are reflected by a mirror surface 127 through the lens 126 to ground glass 102.

Figure 2 shows a cross-section of one column of character patterns, light sources and prisms. In this disclosure for simplicity of illustration and description, two columns of recording apparatus are shown as in Fig. 9, but it will be understood that as many columns of recording apparatus as the maximum number of columns of data it is desired to record would be provided.

In operation, record cards will be analyzed by the card feeding and analyzing mechanism and circuits set up thereby will cause the light source corresponding to the particular character it is desired to record to be illuminated and cause that character to be depicted on the ground glass screen 102. The camera unit 103 (see Fig. 9) is then actuated to record that character and characters for adjacent columns.

The camera unit

The camera unit will now be described in detail. Referring to Figs. 2, 3 and 4, the camera unit comprises a frame plate 129. Fixed in the frame plate 129 is a shutter and lens assembly 130. A shutter trip lever 131 is provided which, when moved downwardly as viewed in Fig. 4, causes actuation of the shutter mechanism in the usual manner. A mounting plate 132 is fixedly secured to the frame plate 129 and fastened in plate 132 is a stud 133 (see Fig. 2) upon which is mounted the film supply spool 134. Rotatably mounted in plate 132 are two shafts 135 and 136 which carry the drive sprockets 137 and 138. Another shaft 139 affords a support for a takeup film spool 140. Shaft 135 has fast to it a ratchet 141 and a driving gear 142 which is meshed with an intermediate gear 143 which in turn is meshed with a gear 144 fixed on shaft 136. A suitable belt and pulley drive connection is provided from a pulley 145 fixed to shaft 136, then to the takeup spool pulley 146 on shaft 139. Shaft 136 is slotted at this end to receive a winding key generally designated 147 in Fig. 3 and which is normally retracted as shown. Suitably carried by the assembly plate 132 is a shutter and film feed operating solenoid 150 which, when energized, is adapted to depress an actuating member 151 and trip the shutter member 131. Member 151 is spring restored as shown and upon restoring movement a pawl 152 pivoted thereon actuates the film feed to advance the film a line space. A blade spring 153 may be used to prevent retrograde movement of ratchet 141.

Referring again to Fig. 2, within the camera housing there is provided a pivoted film lever 154 which is spring urged into contact with the film supply roll. When the film is exhausted, member 154 swings clockwise to such an extent that contacts 155 which may be termed the "film lever contacts" open. The camera assembly is provided with a suitably removable housing or cover generally designated 156 in Fig. 4, and the removable cover is held in the position on the back plate by means of a pair of knurled thumb-screws 157. The film which is designated 158 in Fig. 3 is provided with the usual feeding sprocket holes and passes under the first two of a pair of film guides designated 160, thence through a film gate generally designated 161 (see also Fig. 2), thence under another pair of film guides 162. The film guides 160 and 162 and the film gate 161 are suitably mounted on the assembly plate 132.

The camera is first loaded with the cover 156 removed, then the cover is replaced and upon energization of solenoid 150 a section of film is exposed. Upon deenergization of solenoid 150, the film is advanced a line space and a new section of unexposed film is brought to the film date. When the film is exhausted, the film lever contacts 155 open and the operation stops. The operator then presses the windup key 147 inwardly and winds the remaining section of the film onto the takeup reel 140. The exposed film may then be removed and the camera reloaded.

In actual use, each roll of film after exposure would be removed from the recorder unit and then developed. After development, fixing and drying, printed enlargements of any desired size or length can be made as desired. Duplicate copies in any desired number can also be printed. Reversal film can be used if desired. These steps need not be further described as they are all well known.

Circuit diagram

Before starting the machine, the operator makes certain connections by plugging up the machine. Plug connections are made from plug sockets 163 (Fig. 10) connected to upper brushes B1, to the plug sockets 164 connected to emitters EM1. Further plug connections are made from the proper plug sockets 165 connected to brushes B2 to plug sockets 166 connected to the emitters EM2 for analyzing the intrazone value of a designation on the card. There is provided one of the emitters EM1 and EM2 for each column of data to be recorded.

With cards 82 in the supply hopper 83 (Fig. 1), the operator closes main line switch 170 (Fig. 10) supplying current to lines 171 and 172. With current supplied to the lines 171 and 172, the motor 52 starts to rotate and continues in operation until the switch 170 is opened. With motor 52 in operation, the shaft 53 driven thereby (Fig. 1) also rotates. The operator now depresses the start key 173 and a circuit is completed from line 171, via wire 174, through contacts 173a, controlled by the start key, start relay S and card feed clutch magnet 58 in parallel therewith to line 172. With card feed clutch magnet 58 energized, the armature latch 57 (Fig. 1) is retracted to permit dog 56 to engage the one tooth ratchet 54, thereby causing gear 46 to rotate and provide drive to the picker mechanism, card feeding and card contact rolls in the manner previously described.

The operator may either hold the start key depressed until certain other circuits are completed or may alternatively release the start key and then depress it a second time. In either event during the first card feeding cycle, the first card will be advanced to a position where its leading edge just insulates the brushes B1 from the contact roll 76. With the card in this position, the card lever contacts 87 shift to close card lever contacts 89 at the time shown in the timing diagram (Fig. 4a). This completes a circuit from line 171 through contacts 89, relay coil M to line 172. Relay coil M upon energization closes its contacts MI to provide a circuit for maintaining coil M energized through cam contacts CC8 and contacts MI.

From the timing diagram (Fig. 4a) it may be noted that cam contacts CC8 are closed when contacts 89 open between cards. Relay contacts M2 close to maintain start relay S and card feed clutch magnet 58 energized after the start key 173 is released. During the next cycle the first card is advanced past brushes BI and the zone value of a combinational hole designation is set up on a group of zone setup relays.

The zone relay setup circuit will now be traced. The circuit is from line 171, through relay contacts M3, cam contacts CCI now closed, upper brush contact roll 76 and, assuming an "11" zone designation, through the "11" zone hole in the card, brush BI, plug socket 163 and plug connection to plug socket 164, through emitter EMI at the "11" segment spot, to the zone pickup relay PII, and back to the other side of line 172. If the zone indication were "0," relay P0 would be energized or, if it were "12," relay P12 would be energized.

Relay PII upon energization closes relay contacts PIIa to maintain relay coil PII energized through cam contacts CC2 now closed. Cam contacts CC2 open near the end of the cycle, but before this occurs the setting on the zone control pickup relays is transferred to zone control holding relays. This is effected upon closure of cam contacts CC3 which complete a circuit from line 171, through cam contacts CC3, through relay contacts PIIb now closed, relay coil HII to line side 172. Relay coil HII is maintained energized by closure of its contacts HIIa which provide a circuit from relay HII back to line through cam contacts CC4. Cam contacts CC4 remain closed into the next cycle to keep relay HII energized while the intrazone values 9 to 1 are derived from the card during the next cycle.

Near the end of the cycle, when the first card is passing the lower brushes, the card lever 88 (Fig. 1) is shifted to close contacts 90. Closure of contacts 90 completes a circuit from line 171, through contacts 90, relay coil N to the other side of line 172. Relay coil N closes its contacts NI to complete a circuit to cam contacts CC9. These contacts are closed during the interval that card lever contacts 90 open between cards. Relay contacts N2 close to shunt contacts M2 in the circuit which extends to start relay S and card feed clutch 58. The circuit is from line 171, wire 174, stop key contacts 185a, film lever contacts 155, relay contacts N2 and M2 in parallel, relay contacts SI, start relay S and card feed clutch magnet 58 in parallel to line 172.

During the following cycle, the intrazone values of the card designations will be sensed as the card passes the lower brushes B2. Assuming an intrazone value of "4," a circuit will be completed as follows: from line 172, card lever contacts N3, cam contacts CC5 now closed, lower brush contact roll 71, hole in the card at the "4" index point position, brush B2, plug socket 165, through plug wire connection to plug socket 166, through emitter EM2, relay coil R4 to line 171. Relay coil R4 is maintained energized by a circuit through its relay contacts R4a and cam contacts CC6 which remain closed for the greater part of the cycle.

With relays R4 and HII energized the machine is now conditioned to record the character M. A circuit for transilluminating the character M in the "11" zone is completed as follows: from line 171, contacts 209c now closed, relay contacts HIIb, light source III pertaining to the character M, resistance 184, relay contacts R4b to line 172. With character pattern 110 bearing the character M transilluminated (Fig. 2), the light beam will be redirected by prism 114, thence through lens system 122 and reflected by the partially reflecting surface 121 to ground glass 102.

Closure of cam contacts CC7 near the end of the cycle completes a circuit from line 171, wire 174, cam contacts CC7, relay contacts N3 to shutter trip magnet 150, thereby causing exposure of the character image appearing on the ground glass screen 102 on the film. Opening of cam contacts CC7 will deenergize magnet 150 and cause feeding of the film one line space as previously described with reference to Fig. 4.

It will be appreciated that any number of characters may be depicted on the screen and recorded on the film depending on the capacity of the machine, and the number of columns plugged for recording operations. Operations will continue in this manner until the machine either runs out of cards, thereby opening card lever relay contacts M2 and N2, or the end of a film roll is reached thereby opening film lever contacts 155 or upon depression of the stop key 185 by the operator. Operations on a new series of cards will then be initiated in the same manner as previously described.

The circuits for other characters controlled by different combinations of zone and intrazone values will now be described. With an "11" zone designation, relay contacts HIIb will be closed as before. If the intrazone designation were "9," contacts R9b would be closed and a circuit would be completed from line 172, through contacts R9b, resistance 184, light source III for the character R, relay contacts HIIb, to line 171. Similarly, if the intrazone value were 8, 7, 6, 5, 3, 2, or 1, the light sources for character patterns Q, P, O, N, L, K and J, respectively, would be illuminated. For a zone value of "12," relay contacts H12b would be closed, and for intrazone values of 1, 2, 3, 4, 5, 6, 7, 8 or 9 the R1b, R2b, etc., contacts, respectively, would be closed. This would cause illumination of the light sources for character patterns A, B, C, D, E, F, G, H, or I, respectively.

Energization of relay coil H0 under control of a "0" zone designation will cause closure of relay contacts H0b. An intrazone designation of 2, 3, 4, 5, 6, 7, 8 or 9 will cause closure of relay contacts R2b, R3b, etc. These various intrazone designations will respectively cause illumination of characters S, T, U, V, W, X, Y, or Z.

For numerical characters, i. e., 1, 2 . . . 8, 9, there will be no zone relay energized. Consider, for example, the character 5. The relay contacts R5b will be closed and a circuit will be completed from line 172, through relay contacts R5b, resistance 184, illuminating lamp III for the "5" digit, through normally closed relay contacts H12c, HIIc, H0c to line 171. Circuits for the other significant numerical digits will be completed in a similar manner.

The circuit for the digit zero (0) is a special circuit and is completed in the following manner. Passage of a card bearing a zero perforation past the upper brushes will cause energization of relay coil H0 in the customary manner and effect closure of relay contacts H0b. Passage of this card past the lower brushes will energize relay coil R0 to cause closure of relay contacts R0b. A circuit will then be completed from line 172, through the normally closed relay contacts R9c, R8c, etc. to R3c, R2c, R1c, through the now closed relay contacts R0b, resistance 184, light source 111 for numeral 0, through contacts H0b to line 171. It may be explained that the purpose of the R2c, R3c, etc., serially connected contacts is to break a circuit to the light source 111 for the zero (0) numeral when a zone value of zero is present in conjunction with an intrazone value of 2, 3, 4, 5, 6, 7, 8, or 9. Such a condition would close contacts R0b, but due to one of the serially connected contacts R2c, R3c, etc., being open, no recording of a zero (0) numeral can occur at this time.

In the event that listing of numerical data only is to be effected, the zone pickup plug connections between sockets 163 and 164 will not be made. As a card column bearing zero passes the lower brushes, the R0 relay for that column will be energized to effect closure of relay contacts H0b. A circuit is then completed from line 172, through the serially connected R9c, R8c, etc., to R2c relay contacts normally closed and through the now closed relay contacts R0b, light source 0', normally closed relay contacts H12c, H11c and H0c to line 171. Light source 0' (see Fig. 2) is in the numerical zone and causes recording in the usual way when the shutter trip is actuated. Other digits, i. e., 9, 8, etc., through 1 will be recorded as previously described.

Reference has been made in tracing typical light source illuminating circuits to resistors 184 serially connected to the light sources. The actual value of these resistors is determined by the optical path the rays from a particular light source must travel. If these rays traverse several of the prisms 114, the light source must be brighter than the light source for a character whose light ray path passes through only a few prisms. Hence, in the former case less series resistance will be used than in the latter case. The purpose then of these resistances is to cause transillumination of each character in such a manner that the characters will all be depicted on the screen 102 with uniform intensity.

*Modification using shutter zone operation*

In this modification in place of controlling the circuits to the various light sources by means of zoning relays, zone control shutters to perform a similar function are provided. These operate directly on light rays from a character pattern. Thus, if the character F having a 12 zone and 6 intrazone value is to be recorded, the 6 intrazone value will cause illumination of the characters in all zones that pertain to a 6 intrazone value, namely, F for the 12 zone, 0 for the 11 zone, W for the 0 zone and 6 for the numerical zone. However, the light paths of all the above characters, except F, will be rendered inoperative by shutters or light gates now to be described.

In Fig. 13 there is shown a portion of Fig. 2 with the so-called "light gates" included therein. Referring to Fig. 14 which is a detail view of one of these devices, there is provided a gate 190 movable in a vertical direction in a suitable light-tight holder or guide 191. The upper end of gate 190 is of sufficient thickness to receive the threaded end of a plunger rod 192. Plunger 192 is slidably movable in the solenoid 193. Energization of solenoid 193 will cause the plunger 192 and gate 190 affixed thereto to rise and permit light rays to pass down the tube to lens 119 (see also Fig. 2). Upon deenergization the gate 190 returns to a closed position under action of spring 194 (Fig. 14). Similar light gate mechanisms are provided in the light path for each zone; thus magnet 193 controls the path for the numerical zone, magnet 198 for the "0" zone, magnet 199 for the "12" zone and magnet 200 for the "11" zone. The operation of the machine for this will now be described with reference to the circuit diagram.

Referring now to Fig. 11, the machine is put in operation in exactly the same manner as before by depression of start key 173. As the first card passes the upper brushes B1, the zone control holding relay will be energized and assuming a zone indication of "12" relay H12 will be energized near the end of this cycle. As this same card passes lower brushes B2, assuming an intrazone value of "7," relay coil R7 will be energized. Closure of contacts H12b will complete a circuit from line 171, wire 174, contacts 209c now closed, relay contacts H12b, gate solenoid 199 for the "12" zone and back to the other side of line 172. The relay contacts R7b complete a parallel circuit through resistances 184 and the light sources 111 for digit "7" and characters X, P and G. Referring to Fig. 2, it will be noted that each of these light sources is in a different zone.

Referring again to Fig. 13, it will be seen that the solenoid 199 being energized renders the "12" zone light source effective and, upon tripping of shutter magnet 150 under control of cam contacts CC7, the character "G" will be recorded. Contacts H12c being open prevent energization of the gate solenoid 193 while recording is taking place. If the zone indication were "11," solenoid 200 would be energized to control recording of the character P. If the zone indication were "0," solenoid 198 would be energized to control recording of the character X and, if there were no zone indication, relay contacts H0c, H11c, and H12c would be closed to cause pickup of solenoid 193 which would permit the numeral "7" to be recorded.

If the numeral "0" is present in a column of the card which is to be recorded, the zone relay H0 will be energized to close contacts H0b and energize solenoid 198. Intrazone relay R0 will also be energized to close relay contacts R0b and energize light source 111, by the following circuit: from line 172, through the serially connected relay contacts R9c, R8c, etc., to and through R2c, R1c, relay contacts R0b now closed, resistance 184 and light source 111 for the digit "0" to line 171. With solenoid 198 causing the gate of the "0" zone to be open, recording of the digit "0" will then occur. If a "0" zone alphabetical character is to be recorded such as "V," then a "5" intrazone value will close contacts R5b and open relay contacts R5c, thereby permitting "V" to be recorded but not the digit "0." All other controls are the same for this modification as in the original embodiment, except for straight zero listing with no zone control.

As previously mentioned, in this case relay R0 would be energized (see Fig. 11). Likewise, with no zone control relays H0, H11 and H12 will not be energized and accordingly solenoid 193 will be energized by the same circuit as previously described. With relay R0 energized, relay contacts R0b will be closed and a circuit to illuminate light source 111 for the 0' numeral will be completed from line 172, normally closed relay contacts R9c, R8c, etc., through the now closed relay contacts R0b, light source 111 for the 0' to line 171. Light source 0' is in the numerical zone and with shutter solenoid 193 actuated recording will occur in the usual way when the shutter is tripped.

Readout of a setting for recording purposes

The machine is provided with an auxiliary settable device upon which an amount may be set, and such setting may be caused to select any numerical character for projection after the sensing of cards.

Referring to Fig. 10, 206 represents a conducting slide and 207 a plurality of conducting segments. A settable wiper or brush 208 is provided which may be set to represent a numerical value by moving it to a position where it forms a circuit between the common conducting slide 206 and the correspondingly numbered segment 207. When the operator desires to record the number set up by brush 208, the key 185 is depressed to stop recording if the machine is in operation and the switch 209 shifted to close contacts 209a and 209b and open two sets of contacts 209c and close two sets 209d. Assuming a digit value of "5" is set up, a circuit will then be completed from line 172, through relay contacts 209a, common segment 206, brush 208 spanning to the fifth segment 207, through cable 207a, resistance 184, light source 111 for digit "5," switch contacts 209d now closed to line 171. With the digit "5" transilluminated, the operator now depresses key 210 to close contacts 210a and energize shutter trip magnet 150 and record the digit "5." Similar circuits will be completed for different columns or for different digits therein. To record a setting of "0," a separate zero digit designated 0' is connected to zero segment 207. This is necessary since the "0" in the zero zone cannot be used here as there is no zoning control. The 0' zero is in the numerical zone (see Fig. 2).

The foregoing description has been applied to relay zone control. For readout of a setting for recording purposes with shutter zone control, reference may now be made to Fig. 11. A similar settable device comprising slide 206, segments 207 and brushes 208 like in Fig. 10 is provided. The switch 209 is shifted as before to close contacts 209a, 209b, open contacts 209c and close contacts 209d. Assuming a digit value of "7" is set up, a circuit will then be completed from line 172, through relay contacts 209a, common segment 206, brush 208 spanning the 7th segment 207, through cable 207a, resistance 184, light sources 111 for "G," "P," "X" and digit "7," to line 171. A circuit to energize shutter magnet 193 is completed from line 171, wire 174, relay contacts 209d now closed, to shutter magnet 193 and back to line 172. With shutter magnet 193 energized, the illumination for the digit "7" only will be effective, the operator then depressing key 210 to close contacts 210a and energize shutter trip magnet 150 and record the digit "7." Similar circuits will be completed for different columns or for different digits therein. To record a digit "0" as in Fig. 10, a separate zero digit designated 0' is connected to zero segment 207. This is necessary since the "0" in the zero zone cannot be used here as there is no zoning control. The 0' zero is in the numerical zone (Fig. 2).

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine arranged for control by record cards having columns of index point positions, each column containing a plurality of zone positions and a plurality of intrazone positions, an alphabetic character being represented by a pair of designations, one in a zone position and one in an intrazone position, the combination of sensing means for the zone positions, sensing means for the intrazone positions, a series of alphabetic character patterns, a light source for each pattern, a screen, an optical system intermediate each pattern and said screen, part of said systems being common to all the patterns, illumination of any light source causing projection of the related character pattern upon said screen through the related optical system, and means jointly controlled by both said sensing means upon sensing the alphabetic designations in a card column for causing illumination of the lamp related to the pattern of the alphabetic character designated in the column.

2. In a machine arranged for control by record cards having columns of index point positions, each column containing a plurality of zone positions and a plurality of intrazone positions, an alphabetic character being represented by a pair of designations, one in a zone position and one in an intrazone position, the combination of sensing means for the zone positions, sensing means for the intrazone positions, a series of alphabetic character patterns, a light source for each pattern, a screen, an optical system intermediate each pattern and said screen, part of said systems being common to all the patterns, illumination of any light source causing projection of the related character pattern upon said screen through the related optical system, means controlled by the zone sensing means for partially establishing a current path for illumination of all the lamps related to characters in the zone designated, and means controlled by the intrazone sensing means for completing the current path for one of said lamps in accordance with the intrazone designation.

3. In a machine arranged for control by record cards having columns of index point positions, each column containing a plurality of zone positions and a plurality of intrazone positions, an alphabetic character being represented by a pair of designations, one in a zone position and one in an intrazone position, the combination of sensing means for the zone positions, sensing means for the intrazone positions, a series of alphabetic character patterns, a light source for each pattern, a screen, an optical system intermediate each pattern and said screen, part of said systems being common to all the patterns, illumination of any light source causing projection of the related character pattern upon said screen through the related optical system, and means jointly controlled by both said sensing means upon sensing the alphabetic designations in a card column for rendering the lamp related to the pattern of the alphabetic character sensed effective to project said pattern upon the screen.

4. The invention set forth in claim 3 in which the character patterns are arranged in a common plane with each pattern comprising an opaque surface with a transparent character outlined therein through which light is projected to the optical system.

5. In a device of the class described, a series of stationary character patterns representing all of the digits, arranged in a common plane, a lamp on one side of each pattern, a series of partially reflecting surfaces, one for each pattern, located on the opposite side of the pattern and arranged in a line to reflect all of the patterns along the same single line, a screen in line with said line of projection, said patterns being located at varying distances from the screen and each pattern being projectable through its related reflecting surface and surfaces related to characters nearer the screen and means for selectively illuminating one of said lamps whereby the related pattern will be projected through one or more partially reflecting surfaces to a common area on said screen.

6. The invention set forth in claim 5 in which means are provided for causing the intensity of illumination of the lamps to vary in accordance with the number of partially reflecting surfaces through which the related pattern is projected, whereby all patterns will be projected upon the screen with substantially the same light intensity.

7. In a device of the class described, a first series of stationary character patterns, an objective screen, partially reflecting surfaces adjacent to said screen, a projection system between said patterns and the reflecting surfaces, whereby said patterns are reflected by the reflecting surfaces on to the screen, a second series of stationary character patterns, a projection system between said second series of patterns and said reflecting surface for projecting said second series of patterns through said partially reflecting surfaces on to the screen, whereby both patterns are projected on the screen, one reflected from said surface and the other through said surface, and means for selectively rendering either projection system effective to project the related character patterns on to the screen.

8. In a device of the class described, a stationary character pattern, an objective screen, a partially reflecting surface adjacent to said screen, a projection system between said pattern and the reflecting surface, whereby said pattern is reflected by the reflecting surface on to the screen, a second stationary character pattern, a projection system between said second pattern and said reflecting surface for projecting said second pattern through said partially reflecting surface on to the screen, whereby both patterns are projected on the screen, one reflected from said surface and the other through said surface, a shutter for each pattern normally rendering the optical systems ineffective, and means for opening either of the shutters whereby a selected pattern will be projected on to the screen.

9. In a machine arranged for control by record cards having columns of index point positions, each column containing a plurality of zone positions and a plurality of intrazone positions, an alphabetic character being represented by a pair of designations, one in a zone position and one in an intrazone position, the combination of sensing means for the zone positions, sensing means for the intrazone positions, a series of alphabetic character patterns, a light source for each pattern, a screen, an optical system intermediate each pattern and said screen, part of said systems being common to all the patterns, illumination of any light source causing projection of the related character pattern upon said screen through the related optical system, a series of shutters, one for each optical system, normally rendering the optical systems ineffective, means controlled by the zone sensing means for illuminating the lamps related to characters of the sensed zone, and means controlled by the intrazone sensing means for opening the shutter related to a character within the zone, whereby the character represented in the record card column will be projected on the screen.

ROBERT T. BLAKELY.